United States Patent
Atkin

(10) Patent No.: US 9,146,619 B2
(45) Date of Patent: *Sep. 29, 2015

(54) BI-DIRECTIONAL DISPLAY

(75) Inventor: Steven Edward Atkin, Palm Bay, FL (US)

(73) Assignee: International Business Machines Corporation, Armonk, NY (US)

(*) Notice: Subject to any disclaimer, the term of this patent is extended or adjusted under 35 U.S.C. 154(b) by 1607 days.

This patent is subject to a terminal disclaimer.

(21) Appl. No.: 11/463,131

(22) Filed: Aug. 8, 2006

(65) Prior Publication Data
US 2007/0008331 A1 Jan. 11, 2007

Related U.S. Application Data

(63) Continuation of application No. 09/838,377, filed on Apr. 19, 2001, now Pat. No. 7,120,900.

(51) Int. Cl.
| G06F 17/00 | (2006.01) |
| G06F 3/01 | (2006.01) |
| G06F 17/21 | (2006.01) |
| G06F 3/0489 | (2013.01) |
| G06F 17/22 | (2006.01) |

(52) U.S. Cl.
CPC .............. *G06F 3/018* (2013.01); *G06F 3/0489* (2013.01); *G06F 17/21* (2013.01); *G06F 17/2223* (2013.01)

(58) Field of Classification Search
CPC .............................. G06F 17/21; G06F 17/2223
USPC .................. 715/255–256; 704/8; 717/117
See application file for complete search history.

(56) References Cited

U.S. PATENT DOCUMENTS

| 4,507,734 A | | 3/1985 | Kaldas |
| 5,539,661 A | * | 7/1996 | Nordenstam ............ 379/355.01 |
| 5,572,727 A | * | 11/1996 | Larsson et al. ......................... 1/1 |
| 5,784,069 A | * | 7/1998 | Daniels et al. ................. 345/467 |
| 5,793,381 A | | 8/1998 | Edberg et al. |
| 5,883,986 A | | 3/1999 | Kopec et al. |
| 5,889,481 A | | 3/1999 | Okada |

(Continued)

OTHER PUBLICATIONS

Mark Davis, "The Bidirectional Algorithm", http://www.unicode.org/reports/tr9/tr9-6.html, published Nov. 11, 1999, pp. 1-21.*

(Continued)

*Primary Examiner* — Thu Huynh
(74) *Attorney, Agent, or Firm* — Robert H. Frantz; Parashos Kalaitzis

(57) ABSTRACT

A bidirectional text display method embodied in a functional programming language which first assigns bidirectional attributes to a logical character stream. Next, through explicit processing, level numbers are assigned, honoring any directional overrides present in the logical character stream. Subsequent weak and neutral type processing potentially causes attribute types to change based upon surrounding attribute types. Then, implicit processing assigns final level numbers to the stream which control reordering. Finally, reordering processing produces a sequence of characters in display order. By separating the facets of layout dealing with reordering from those that are concerned with rendering, such as line breaking, glyph selection, and shaping, the Haskell-based method is more discernible and comprehendable, thereby allowing it to be more useful as a model upon which others may base bidirectional implementations.

30 Claims, 3 Drawing Sheets

(56) References Cited

U.S. PATENT DOCUMENTS

| | | | |
|---|---|---|---|
| 5,929,792 A | 7/1999 | Herriot | |
| 5,946,499 A | 8/1999 | Saunders | |
| 5,946,648 A | 8/1999 | Halstead et al. | |
| 6,055,365 A | 4/2000 | Tye | |
| 6,070,179 A | 5/2000 | Craft | |
| 6,151,624 A | 11/2000 | Teare et al. | |
| 6,204,782 B1 | 3/2001 | Gonzalez et al. | |
| 6,243,701 B1 | 6/2001 | Shih et al. | |
| 6,275,789 B1 | 8/2001 | Moser et al. | |
| 6,324,500 B1 | 11/2001 | Amro et al. | |
| 6,397,259 B1 | 5/2002 | Lincke et al. | |
| 6,438,516 B1 | 8/2002 | Davis | |
| 6,493,735 B1* | 12/2002 | Kumhyr | 715/236 |
| 6,611,845 B1 | 8/2003 | Dockter et al. | |
| 6,738,827 B1 | 5/2004 | Abir et al. | |
| 6,937,975 B1* | 8/2005 | Elworthy | 704/9 |
| 6,944,820 B2* | 9/2005 | Feinberg | 715/256 |
| 7,120,900 B2 | 10/2006 | Atkin | |
| 7,293,229 B2* | 11/2007 | Feinberg | 715/273 |
| 7,366,977 B2* | 4/2008 | Chokshi | 715/209 |
| 2002/0030689 A1* | 3/2002 | Eichel et al. | 345/588 |
| 2002/0143521 A1* | 10/2002 | Call | 704/1 |
| 2002/0156688 A1* | 10/2002 | Horn et al. | 705/26 |
| 2003/0115040 A1 | 6/2003 | Xing et al. | |
| 2004/0039996 A1 | 2/2004 | Flam | |
| 2006/0080641 A1* | 4/2006 | Taylor et al. | 717/126 |

OTHER PUBLICATIONS

Hutton et al., "comp.lang.functinal Frequently Asked Questions", http://www.faqs.org/faqs/func-lang-faq/, published on Aug. 1, 1999, pp. 1-31.*

Stansifer et al., "Implementations of Bidirectional Reordering Algorithms", https://cs.fit.edu/Projects/tech_reports/cs-2000-1.pdf from web page https://cs.fit.edu/Projects/tech_reports/tr2000.html, published Oct. 4, 2000, pp. 1-14.*

USPTO; Office Actions, Applicant Replies, Information Disclosure Statements, Non-patent Literature, and BPAI Documents from U.S. Appl. No. 09/891,341, filed Jun. 24, 2001 by Steven Edward Atkin; retrieved on Nov. 4, 2009.

USPTO, Office Actions, Applicant replies, and Information Disclosure Statements for U.S. Patent 7,120,900; U.S. Appl. No. 09/838,377, filed Apr. 19, 2001 by Steven Edward Atkin.

USPTO; Office Actions, Applicant Replies, and Information Disclosure Statements from U.S. Appl. No. 09/931,302, now U.S. 6,883,007, filed Aug. 16, 2001 by Steven Edward Atkin; retrieved on Nov. 4, 2009.

USPTO; Office Actions, Applicant Replies and Information Disclosure Statements from U.S. Appl. No. 09/838,376, now U.S. patent 7,086,004, filed Apr. 19, 2001 by Steven Edward Atkin; retrieved on Nov. 4, 2009.

Glossary of Unicode Terms, http://www.unicode.org/glossary (last visited Jan. 28, 2009), pp. 1, 13, and 23 of 41 printout pages.

Wikipedia, http://en.wikipedia.org/wiki/Domain_name (last visited Jan. 28, 2009), "Domain name".

Wikipedia, http://en.wikipedia.org/wiki/Bi-directional_text (last visited Jan. 28, 2009), "Bi-directional text".

Atkin, Steven and Stansifer, Ryan, "Implementaions of Bidirectional Reorder Algorithms,"18th International Unicode Conference, Apr. 2001.

Unicode Consortium, The,"Unicode Standard Annex #15—Unicode Normalization Forms" published at http://www.unicode.org/unicode/reports/tr15, retrieved Jun. 15, 2001.

Mockapetris, P., "RFC 1034—Domain Names Concepts and Facilties." published at http://www.cis.ohio-state.edu/cgi-bin/rfc/rfc1034.html, retrieved Jun. 25, 2001.

Unicode Consortium, The, "Unicode Standard Annex #9—The Bidirectional Algorithm." published at http://www.unicode.org/unicode/reports/tr9, retrieved Jun. 25, 2001.

USPTO; examination correspondence in related U.S. Appl. No. 09/891,341, filed Jun. 24, 2001 by Steven Edward Atkin, currently under allowance.

Unicode; "Glossary of Unicode Terms", published at http://www.unicode.org/glossary; latest version retrieved Jun. 10, 2010.

Wikipedia; "Domain Name"; retrieved from http://en.wikipedia.org/wiki/Domain_name retrieved on Jan. 28, 2009.

Wikipedia; "Bidirectional Text"; retrieved from http://en.wikipedia.org/wiki/Bidirectional_text retrieved on Jan. 28, 2009.

Atkins, Steven, et al.; Implementations of Bidirectional Reordering Algorithms; 18th International Unicode Conference, Apr. 2001.

Unicode Consortium, The; "Unicode Standard Annex #15—Unicode Normalization Forms" published at http://www.unicode.org/unicode/reports/tr15, Mar. 3, 2001.

Mockapertris, P; "RFC 1034—Domain Names Concepts and Facilties" published at http://www.ics.ohio-state.edu/cqu-bin/rf/r1c1034.html, Nov. 1987.

Unicode Consortium, The; "Unicode Standard Annex #9—The Bidirectional Algorithm"; published at http://www.unicode.org/unicode/reports/tr9, Mar. 23, 2001.

Hutton, Graham; "Comp.lang.functional Frequently Asked Questions"; published at http://www.faqs.org/faqs/func-lang-faq/ on Jul. 30, 1999.

El-Sadany, T.A.,et al; "An Arabic Morphological System" published by IBM Systems Journal; vol. 28, No. 4; pp. 600-612, 1989.

Mudawwar, M.; "Multicode: A Truly Multilingual Approach to Text Encoding"; published at IEEE, vol. 30, Issue 4, Apr. 1997, pp. 34-43.

Whistler, K., et al; "Language Tagging in Unicode Plain Text", published at ACM, Jan. 1999, pp. 1-14.

Goldsmith, D., et al; "UTF-7: A Mail-Safe Transformation Format of Unicode"; May 1997, pp. 1-15.

Unicode Consortium; "Plane 14 Characters for Language Tags"; published online at http://www.unicode.org/reports/tr7, Aug. 31, 2000.

Durst, Martin, et al; "Unicode in XML and Other Markup Languages"; published online at http://www.unicode.org/unicode/reports/tr20, Dec. 2000.

USPTO; recent examination correspondence in related U.S. Appl. No. 09/891,341, filed Jun. 26, 2001, by Steven Edward Atkin, currently in examination.

El-Sadany, T.A., et al. "An Arabic morphological system", IBM Systems Journal, vol. 28 No. 4, 1989, pp. 600-612.

Hutton, Graham; "FAQ for comp.lang.functional", University of Nottinghan, Jul. 30, 1999, pp. 1-19.

USPTO; examination correspondence in related U.S. Appl. No. 09/838,377, filed Apr. 19, 2001 by Steven Edward Atkin, now US patent 7,120,900.

USPTO; recent examination correspondence in related U.S. Appl. No. 09/891,341, filed Jun. 26, 2001, by Steven Edward Atkin.

USPTO; recent Notice of Allowance (mailed Jul. 5, 2011) in related U.S. Appl. No. 09/891,341, filed by Steven Edward Atkin on Jun. 26, 2001.

USPTO; recent examination correspondence in related U.S. Appl. No. 09/891,341, filed Jun. 26, 2001 by Steven Edward Atkin.

* cited by examiner

BI-DIRECTIONAL DISPLAY

CROSS-REFERENCE TO RELATED APPLICATIONS (CLAIMING BENEFIT UNDER 35 U.S.C. 120)

This patent application is a continuation of U.S. patent application Ser. No. 09/838,377, filed on Apr. 19, 2001, by Steven Edward Atkin, now U.S. Pat. No. 7,120,900.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This patent application is a continuation of U.S. patent application Ser. No. 09/838,377, filed on Apr. 19, 2001, by Steven Edward Atkin, which is now under allowance. This invention relates to the technologies of computer displays and interpretation of file and data for display on a computer. This invention especially relates to the technologies of bi-directional display methods for displaying portions of data which require orientation from left-to-right and from right-to-left to support various international character sets and languages.

2. Description of the Related Art

Prior to the introduction of rich encoding schemes such as Unicode and ISO 10646, most text streams consisted of characters originating from a single script. Traditionally an encoding was comprised of one national script plus a subset of the Latin script (ASCII 7) which fit within the confines of an 8 bit character type. In such an environment, presentation of text is a relatively trivial matter.

For the most part, the order in which a program stores its characters (logical order) is equivalent to the order in which they are visually presented (display order). Thus, there is a direct correlation between the logical order and display order. Exceptions to this rule include scripts which are written from right to left, such as Arabic, Hebrew, Farsi, Urdu, and Yiddish.

One existing method to solve this problem is to require computer users, such as computer programmers or web browser users, to enter characters in display order. This is no problem for users of left-to-right languages. However, for users of right-to-left languages, this requires the user to enter the characters and words in "reverse order". For example, to create a text stream containing Arabic characters, the user must enter them backwards.

This solution is not elegant, and it becomes cumbersome when right-to-left and left-to-right scripts are intermixed, creating bi-directional scripts.

Another solution known in the art is to allow users to enter text in logical order, but to require them to use some explicit directional formatting codes within the script, for example, 0x202B and 0x202A in Unicode, for segments of text that run contrary to the base text direction. As this is acceptable in some instances, it has problems in practice, as well. First, it is undefined what a computer should do with the explicit control codes in tasks other than displaying the script. This may cause problems when these formatting codes are received by searching algorithms, or when they are interchanged between systems.

These explicit formatting codes require specific code points to be set-aside for them, as well. In some encodings, this may be unacceptable due to the fixed number of code points available and the number of code points required to represent the script itself.

Ideally, a system of encoding mixed direction scripts would maintain the flexibility of entering characters in logical order while still achieving the correct visual appearance and display order. Such algorithms do exist, and are called "implicit layout algorithms".

Implicit layout algorithms require no explicit directional codes nor any higher order protocols. These algorithms can automatically determine the correct visual layout by simply examining the logical text stream. Yet in certain cases correct layout of a text stream may still remain ambiguous. Consider the following example in TABLE 1 in which Arabic letters are represented by upper case Latin characters.

TABLE 1

| Ambiguous layout |
| --- |
| fred does not believe TAHT YAS SYAWLA I |

In the absence of context, such as a base or paragraph direction, there are two possible ways to display the sentence. When displayed from left to right, it appears as "Fred does not believe I always say that", and when displayed from right to left, it appears as "I always say that Fred does not believe". As evident from this example, the two interpretations can represent completely different meanings, and may give no clue whatsoever that there has been an error in the display of the script.

The Unicode Bi-directional Algorithm rectifies such problems by providing a mechanism for unambiguously determining the visual representation of all raw streams of Unicode text. The algorithm is based upon existing implicit layout algorithms and is supplemented by the addition of explicit directional control codes.

Generally the Unicode implicit rules are sufficient for the layout of most text streams. However, there are cases in which the Unicode algorithm may give inappropriate or inaccurate display results. For example, a telephone number appearing in a stream of Arabic letters "MY NUMBER IS (321)713-0261." This should not be rendered as a mathematical expression as show in TABLE 2. As demonstrated, without knowledge of the use of the numbers in this context, the correct display cannot correctly be determined.

TABLE 2

| Rendering numbers |
| --- |
| Incorrect display: 0261–713(321) SI REBMUN YM |
| Correct display: (321)713–0261 SI REBMUN YM |

Various implementations of the Unicode Bi-directional Algorithm have been proposed in technical reports, such as Unicode Technical Report #9, including "Pretty Good Bidi Algorithm" (PGBA), "Free Implementation of the Bidi Algorithm" (FriBidi)], "IBM Classes for Unicode" (ICU), Java 1.2, Unicode Java Reference, and Unicode C Reference.

Currently, there exist two reference implementations of the Unicode Bidirectional algorithm, one in Java and the other in C, as well as printed textual descriptions contained in technical reports such as Unicode Technical Report #9.

Upon our testing of the reference implementations of the Unicode Bidirectional algorithm on a large number of concise and carefully crafted test cases of basic bidirectional text, several problems and ambiguous results are found.

To simulate Arabic and Hebrew input/output, a simple set of rules can be utilized. These rules make use of characters from the Latin-1 character set. The character mappings allow Latin-1 text to be used instead of real Unicode characters for Arabic, Hebrew, and control codes. This is an enormous convenience in writing, reading, running and printing the test cases. This form is the same as the one used by the Unicode Bidirectional Reference Java Implementation, as shown in TABLE 3.

Unfortunately not all the implementations adhere to these rules in their test cases. To compensate for this, changes were made to some of the implementations.

TABLE 3

Bidirectional character mappings

| Type | Arabic | Hebrew | Mixed | English |
|------|--------|--------|-------|---------|
| L    | a–z    | a–z    | a–z   | a–z     |
| AL   | A–Z    |        | A–M   |         |
| R    |        | A–Z    | N–Z   |         |
| AN   | 0–9    |        | 5–9   |         |
| EN   |        | 0–9    | 0–4   | 0–9     |
| LRE  | [      | [      | [     | [       |
| LRO  | {      | {      | {     | {       |
| RLE  | ]      | ]      | ]     | ]       |
| RLO  | }      | }      | }     | }       |
| PDF  |        |        |       |         |
| NSM  | ~      | ~      | ~     | ~       |

In the Unicode C reference implementation, additional character mapping tables were added to match those of the Unicode Java Reference implementation. Also the bidirectional control codes were remapped from the control range 0x00-0x1F to the printable range 0x20-0x7E. This remapping allowed test results to be compared more easily.

In PGBA and FriBidi, the character attribute tables were modified to match the character mappings outlined in TABLE 3. However, the strategy we used for evaluation of ICU and Java was slightly different. In the ICU and Java test cases, the character types are used rather than a character mapping. So, in places where our test cases required a specific type, that type was simply used rather than a character mapping.

The test cases employed are presented in TABLES 4 through 7. The "source" column of each table shows the test case script input and a test case number, and the "expected" column sets forth what the correct display order output should have been.

TABLE 4

Arabic Charmap Tests

| | Source | Expected |
|---|--------|----------|
| 1 | car is THE CAR in arabic | car is RAC EHT in arabic |
| 2 | CAR IS the car IN ENGLISH | HSILGNE NI the car SI RAC |
| 3 | he said "IT IS 123, 456, OK" | he said "KO,456, 123 SI TI" |
| 4 | he said "IT IS (123, 456), OK" | he said "KO, (456, 123) SI TI" |
| 5 | he said "IT IS 123,456, OK" | he said "KO, 123,456 SI TI" |
| 6 | he said "IT IS (123,456), OK" | he said "KO, (123,456) SI TI" |
| 7 | HE SAID "it is 123, 456, ok" | "it is 123, 456, ok" DIAS EH |

TABLE 4-continued

Arabic Charmap Tests

| | Source | Expected |
|---|--------|----------|
| 8 | <H123>shalom</H123> | <123H/>shalom<123H> |
| 9 | HE SAID "it is a car!" AND RAN | NAR DNA "!it is a car" DIAS EH |
| 10 | HE SAID "it is a car!x" AND RAN | NAR DNA "it is a car!x" DIAS EH |
| 11 | -2 CELSIUS IS COLD | DLOC SI SUISLEC -2 |
| 12 | SOLVE 1*5 1-5 1/5 1+5 | 5+1 5/1 5-1 5*1 EVLOS |
| 13 | THE RANGE IS 2.5..5 | 5..2.5 SI EGNAR EHT |
| 14 | IOU $10 | 10$ UOI |
| 15 | CHANGE -10% | %10- EGNAHC |
| 16 | -10% CHANGE | EGNAHC %10- |
| 17 | he said "IT IS A CAR!" | he said "RAC A SI TI!" |
| 18 | he said "IT IS A CAR!X" | he said "X!RAC A SI TI" |
| 19 | (TEST) abc | abc (TSET) |
| 20 | abc (TEST) | abc (TSET) |
| 21 | #@$ TEST | TSET $@# |
| 22 | TEST 23 ONCE abc | abc ECNO 23 TSET |
| 23 | he said "THE VALUES ARE 123, 456, 789, OK" | he said "KO, 789, 456, 123 ERA SEULAV EHT". |
| 24 | he said "IT IS A bmw 500, OK." | he said "A SI TI bmw KO, 500." |

TABLE 5

Hebrew Charmap Tests

| | Source | Expected |
|---|--------|----------|
| 1 | HE SAID "it is 123, 456, ok". | "it is 123, 456, ok" DIAS EH |
| 2 | <H123>shalom</H123> | <123H/>shalom<123H> |
| 3 | <h123>SAALAM</h123> | <h123>MALAAS</h123> |
| 4 | -2 CELSIUS IS COLD | DLOC SI SUISLEC -2 |
| 5 | -10% CHANGE | EGNAHC -10% |
| 6 | TEST ~~~23%%% ONCE abc | abc ECNO 23%%%~~~ TSET |
| 7 | TEST abc ~~~23%%% ONCE abc | abc ECNO abc ~~~23%%% TSET |
| 8 | TEST abc@23@cde ONCE | ECNO abc@23@cde TSET |
| 9 | TEST abc 23 cde ONCE | ECNO abc 23 cde TSET |
| 10 | TEST abc 23 ONCE cde | cde ECNO abc 23 TSET |
| 11 | Xa 2 Z | Z a 2X |

TABLE 6

Mixed Charmap Tests

| | Source | Expected |
|---|--------|----------|
| 1 | A~~ | ~~A |
| 2 | A~a~ | a~~A |
| 3 | A1 | 1A |
| 4 | A1 | 1 A |
| 5 | A~1 | 1~A |
| 6 | 1 | 1 |
| 7 | a1 | a 1 |
| 8 | N1 | 1 N |
| 9 | A~ 1 | 1 ~~A |
| 10 | A~a1 | a1~A |
| 11 | N1 | 1N |
| 12 | a1 | a1 |
| 13 | A~N1 | 1N~A |
| 14 | NOa1 | a1ON |
| 15 | ½ | ½ |
| 16 | 1,2 | 1,2 |
| 17 | 5,6 | 5,6 |
| 18 | A½ | 2/1A |
| 19 | A1,5 | 1,5A |
| 20 | A1,2 | 1,2A |
| 21 | 1,.2 | 1,.2 |
| 22 | 1,A2 | 2A,1 |
| 23 | A5,1 | 5,1A |
| 24 | +$1 | +$1 |

TABLE 6-continued

Mixed Charmap Tests

| | Source | Expected |
|---|---|---|
| 25 | 1+$ | 1+$ |
| 26 | 5+1 | 5+1 |
| 27 | A+$1 | 1$+A |
| 28 | A1+$ | $+1A |
| 29 | 1+/2 | 1+/2 |
| 30 | 5+ | 5+ |
| 31 | +$ | +$ |
| 32 | N+$1 | +$1N |
| 33 | +12$ | +12$ |
| 34 | a/1 | a/1 |
| 35 | 1,5 | 1,5 |
| 36 | +5 | +5 |

TABLE 7

Explicit Override Tests

| | Source | Expected |
|---|---|---|
| 1 | a}}}def | afed |
| 2 | a}}}DEF | aFED |
| 3 | a}}}defDEF | aFEDfed |
| 4 | a}}}DEFdef | afedFED |
| 5 | a{{{def | adef |
| 6 | a{{{DEF | aDEF |
| 7 | a{{{defDEF | adefDEF |
| 8 | a{{{DEFdef | aDEFdef |
| 9 | A}}}def | fedA |
| 10 | A}}}DEF | FEDA |
| 11 | A}}}defDEF | FEDfedA |
| 12 | A}}}DEFdef | fedFEDA |
| 13 | A{{{def | defA |
| 14 | A{{{DEF | DEFA |
| 15 | A{{{defDEF | defDEFA |
| 16 | A{{{DEFdef | DEFdefA |
| 17 | ~~abc | abc |
| 18 | ~}abc | cba |
| 19 | }^abc | abc |
| 20 | }^abc | abc |
| 21 | }~}abc | cba |
| 22 | }~{abc | abc |
| 23 | }~}abc | cba |
| 24 | }}abcDEF | FEDcba |

All implementations were tested by using the test cases from TABLES 4 through 6. The implementations that support the Unicode directional control codes (LRO, LRE, RLO, RLE, and PDF) were further tested using the test cases from TABLE 7. At this time, the directional control codes are only supported by ICU, Java 1.2, Unicode Java reference, and Unicode C reference.

When the results of the test cases were compared, the placement of directional control codes and choice of mirrors was ignored. This is permitted as the final placement of control codes is arbitrary and mirroring may optionally be handled by a higher order protocol.

TABLES 8-10 detail the test result differences among the implementations with respect to the expected results. Only PGBA, FriBidi and the Unicode C implementations returned results that were different from the expected results; the Unicode Java reference, Java 1.2, and ICU passed all test cases.

TABLE 8 a. Arabic Test Differences for PGBA 2.4

4 he said "KO ,)456 ,123( SI TI"
6 he said "KO ,)123,456( SI TI"

12 1+5 1/5 1–5 5*1 EVLOS
14 $10 UOI
15 %-10 EGNAHC
16 EGNAHC %-10
19 abc )TSET(
24 he said "A SI TI bmw 500, KO."

b. Arabic Test Differences for FriBidi 1.12

2 SI RAC the car NI ENGLISH
7 "ok ,456 ,123 it is" DIAS EH
8 <123H>shalom</123H>
9 DIAS EH "it is a car!" DNA RAN
10 DIAS EH "it is a car!x" DNA RAN
11 -SI SUISLEC 2 COLD
15 10-EGNAHC%
16 -10% CHANGE
19 (TSET) abc
21 #@$ TEST
22 ECNO 23 TSET abc c. Arabic Test Differences for Unicode C Reference 7 "ok ,456 ,123 it is" DIAS EH
11 DLOC SI SUISLEC 2-12

TABLE 9

Hebrew Test Differences

| | PGBA 2.4 | FriBidi 1.12 |
|---|---|---|
| 5 | EGNAHC % – 10 | |
| 6 | abc ECNO %%%23~~~TSET | |
| 7 | abc ECON %%%23~~~abc TSET | |
| 11 | Z 2 aX | a 2X |

TABLE 10

Mixed test differences

| | PGBA | FriBidi 1.12 |
|---|---|---|
| 1 | | A~~ |
| 2 | ~a~A | ~Aa~ |
| 10 | 1a~A | ~Aa1 |
| 14 | 1a~A | |
| 18 | ½A | ½A |
| 19 | | 5.1A |
| 21 | | 2, 1 |
| 23 | | 1, 5A |
| 27 | | +$1A |
| 28 | | 1 + $A |
| 32 | 15N | |
| 35 | | 5,1 |

In the PGBA reference implementation, types AL and R are treated as being equivalent. This in itself does not present a problem as long as the data stream is free of AL and EN (European number). However, a problem arises when AL is followed by a EN. For example, test case 18 from TABLE 6. In this situation, the ENs should be treated as AN's (Arabic number) and not left as EN's.

The handling of NSM is also different in PGBA. PGBA treats NSM as being equal to ON (other neutral). This delays the handling of NSM until the neutral type resolution phase rather than in the weak type resolution phase. By delaying their handling, the wrong set of rules are used to resolve the NSM type. For example, in test case 2 from TABLE 6 the last NSM should be treated as type L instead of type R.

There are a few problems with the FriBidi implementation, as well. Specifically, when an AL is followed by a EN the EN is not being changed to type AN. See test case 18 in TABLE 6. This is the same symptom as was found in PGBA, but the root cause is different. In FriBidi, step W2 (weak processing phase rule two) the wrong type is being examined it should be type EN instead of type N. Additionally, there is a problem in determining the first strong directional character. The only types that are recognized as having a strong direction are types R and L. Type AL should also be recognized as a strong directional character. For example, when test case 1 from TABLE 6 is examined FriBidi incorrectly determines that there are no strong directional characters present. It then proceeds to default the base direction to type L when it should actually be of type R. This problem also causes test cases 2, 9, and 11 from TABLE 4 to fail.

The greatest hindrance to the creation of a method for converting logical data streams to display streams lies in the problem description. The problem of bidirectional layout is ill defined with respect to the input(s) and output(s).

Certainly the most obvious input is the data stream itself. Several situations require additional input in order to correctly determine the output stream. For example, in Farsi mathematical expressions are written left to right while in Arabic they are written right to left. This may require a special sub input (directional control code) to appear within stream for proper handling to occur. If it becomes necessary to use control codes for obtaining the desired results the purpose of an algorithm becomes unclear.

The situation becomes even more cloudy when one considers other possible inputs (paragraph levels, line breaks, shaping, directional overrides, numeric overrides, etc.) Are to be treated as separate inputs? If they are treated as being distinct, when, where and how should they be used? Determining the output(s) is not simple either. The correct output (s) is largely based on the context in which an algorithm be used. If an algorithm is used to render text, then appropriate outputs might be a glyph vector and a set of screen positions. On the other hand, if an algorithm is simply being used determine character reordering, then an acceptable output might just be a reordered character stream.

The Unicode Bidirectional algorithm has gone through several iterations over the years. The current textual reference been greatly refined. Nevertheless, we believe that there is room for improvement. Implementing a bidirectional layout algorithm is not a trivial matter even when one restricts an implementation to just reordering. Part of the difficulty can be attributed to the textual description of the algorithm. Additionally there are areas that require further clarification.

As an example consider step L2 of the Unicode Bidirectional Reference Algorithm. It states the following, "From the highest level found in the text to the lowest odd level on each reverse any contiguous sequence of characters that are at level or higher." This has more than one possible interpretation. It could mean that once the highest level has been found and processed the next level for processing should one less than the current level. It could also be interpreted meaning that the next level to be processed is the next lowest level actually present in the text, which may be greater one less than the current level. It was only through an examination of Unicode's Java implementation that we were to determine the answer.

There are also problems concerning the bounds of the Uni-code Bidirectional Algorithm. In the absence of higher order protocols it is not always possible to perform all the steps of Unicode Bidirectional Algorithm. In particular, step L4 requires mirrored characters to be depicted by mirrored glyphs their resolved directionality is R. However, glyph selection requires knowledge of fonts and glyph substitution tables. One possible mechanism for avoiding glyph substitutions is to perform mirroring via character substitutions. In this approach mirrored characters are replaced by their corresponding character mirrors. In most situations this approach yields the same results. The only drawback occurs when a mirrored character does not have its corresponding mirror encoded in Unicode. For example, the square root character (U221A) does not have its corresponding mirror encoded.

Such situations have placed developers in a quandary. One solution is to use the implementations (Java and C) as a reference. But these implementations don't agree in every case. Furthermore the implementations have different goals. The Java implementation follows the textual reference closely while the C implementation offers performance improvements.

However, if computer source code is to be used as a reference design, then source code that is more attuned to describing these types of methods and algorithms is required. The flexibility, extensibility, and understandability of the imperative language references causes these references to be inadequate.

For example, using the imperative language reference, it matters what character encoding one uses (UCS4, UCS2, or UTF8). In "C", the size of types are not guaranteed to be portable, making C unsuitable as a reference. In the Java, reference implementation the ramifications of moving to UCS4 are unclear.

Therefore, there is a need in the art for a new reference method for bidirectional text script interpretation for display, which avoids the errors in interpretation of the existing references, as well as provides a framework upon which future, improved models may be realized. Preferably, the new method should separate details that are not directly related to the method such that text and character reordering is completely independent from character encoding.

BRIEF DESCRIPTION OF THE DRAWINGS

The following detailed description when taken in conjunction with the figures presented herein provide a complete disclosure of the invention.

SUMMARY OF THE INVENTION

In a first aspect of the present invention, a bidirectional text display method embodied in a functional programming language, rather than an imperative programming language, is provided to solve the problems of the currently available bidirectional display methods. According to the preferred embodiment, the functional language Haskell is used to provide the encoding of the process of the invention. However, it will be recognized by those skilled in the art that alternate functional languages, such as Standard ML (SML), Miranda, Lisp, Scheme, or Erlang, may also be employed to encode the process of the invention.

In the first step of the method, bidirectional attributes are looked up and assigned to a logical character stream. The attributes are preferably obtained from an online character database.

Next, through explicit processing, level numbers are assigned, honoring any directional overrides present in the logical character stream. Subsequent weak and neutral type processing potentially causes attribute types to change based upon surrounding attribute types. Then, implicit processing assigns final level numbers to the stream which control reordering. Finally, reordering processing produces a sequence of characters in display order.

By separating the facets of layout dealing with reordering from those that are concerned with rendering, such as line breaking, glyph selection, and shaping, the Haskell-based method is more discernible and comprehendable, thereby allowing it to be more useful as a model upon which others may base bidirectional implementations.

DETAILED DESCRIPTION OF THE INVENTION

The invention is realized in part by a computing platform, such as an IBM-compatible personal computer, Apple MacIntosh™, or other computer hardware platform, running a common operating system such as Linux, UNIX, Microsoft's Windows™, IBM's AIX™ or OS/2™. According to the preferred embodiment, the method is encoded in the functional programming language Haskell, which can be executed by many computing platforms suitably equipped with one of several widely-available Haskell interpreters, or compiled from Haskell to machine-specific executable code.

Figure 1:
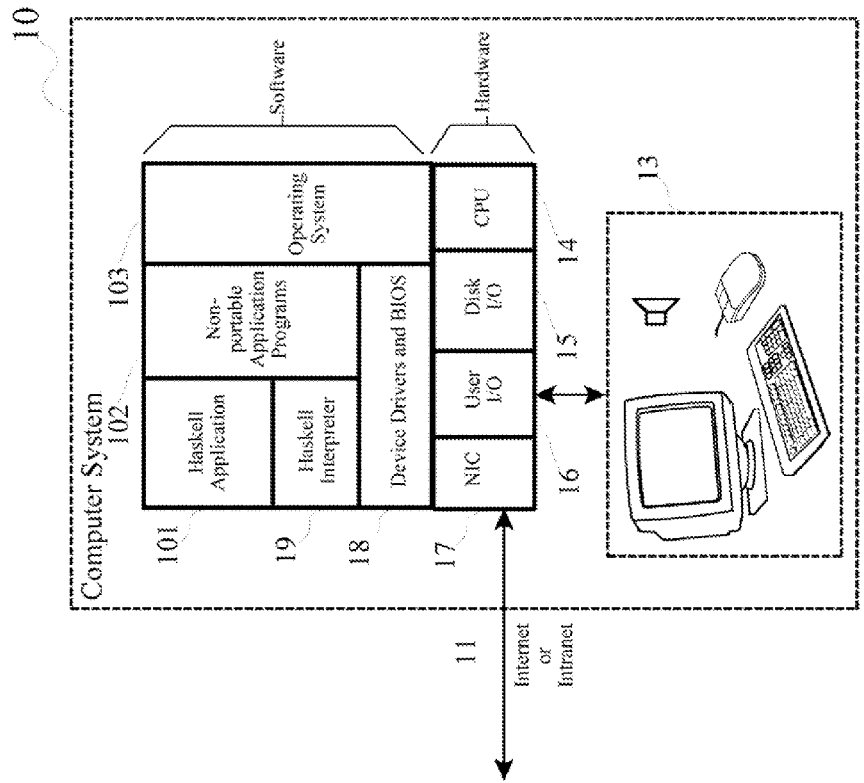
FIG. 1 shows the arrangement of components of a computer system which is capable of executing Haskell programs.

Turning to FIG. 1, a generalized organization of such a computer platform (10) is shown. The computer platform (10) has a central processing unit (CPU) (14), computer readable memory devices, a set of device drivers and a basic input/output system (BIOS) (1a), and typically an operating system (103), such as those mentioned previously. Most computer platforms, such as a personal computer, are also equipped with disk interfaces (15) and disks; user device I/O (16) to interface to keyboards, pointing devices, and a display; and a network interface card or device (17) allowing communications to a computer network, wireless network, or the Internet. Some computer platforms, such as personal digital assistants, web-enabled telephones, and Internet appliances may not be provided with all of these components, but in general, the functionality of these components is present in some form.

The computer platform (10) is also typically provided with one or more non-portable, machine-specific application programs (102).

According to the preferred embodiment, the computer platform is provided with a Haskell interpreter (101), preferably the Hugs 98 interpreter which is freely available from the "HugsOnline" web site for a variety of operating systems and computer platform.

The remaining disclosure of the invention is presented relative to the computer program implementation of the method for displaying bidirectional text scripts, referred to as Haskell Bidi (HaBi).

One might ask why implement the Unicode Bidirectional algorithm in a purely functional language, such as Haskell, when so many other implementations already exist? It is the authors contention that a greater understanding of the algorithm is best obtained by a clear functional description of its operations. Without a clear description, implementers may encounter ambiguities that ultimately lead to divergent implementations, contrary the primary goal of the Unicode Bidirectional Algorithm.

Currently available bidirectional text script display methods (BiDi) are implemented in imperative languages, such as C and Java, instead of a functional language, such as Haskell. The imperative nature of these languages leaves the possibility of special cases and circumstances not being properly handled by the final code, as demonstrated by the testing described in the BACKGROUND OF THE INVENTION.

Thus, in a first aspect of the present invention, a method of script-to-display interpretation for bidirectional text scripts is implemented in a functional language, preferably Haskell. More specifically, the preferred embodiment uses the Hugs 98 version of Haskell 98 as it is widely available (Linux, Windows, and Macintosh) and easily configurable.

Figure 3:
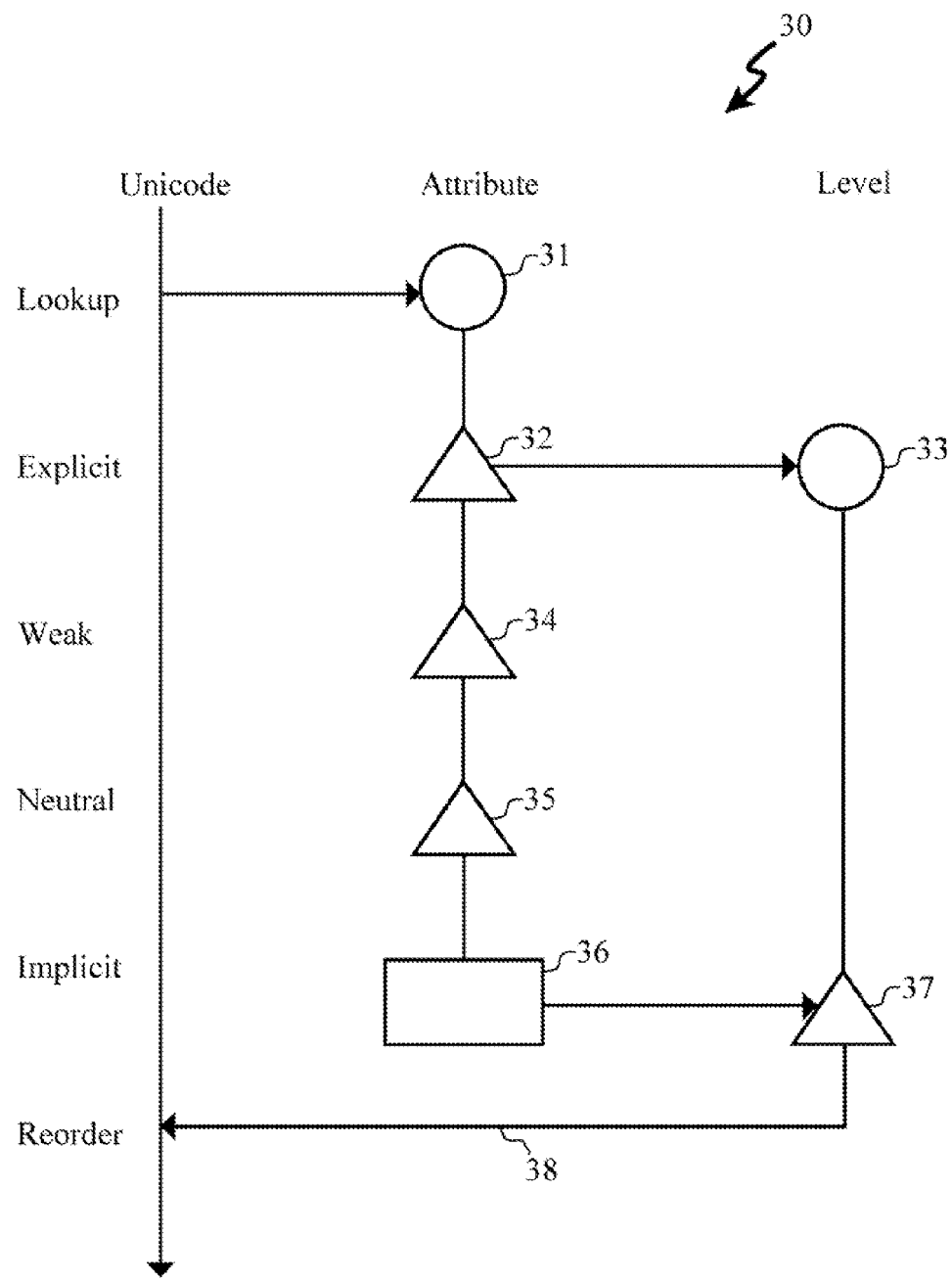
FIG. 3 shows the five phases of the method in the form of a data flow diagram.

Since the dominant concern in HaBi is comprehension and readability, the implementation closely follows the textual description as published in the Unicode Technical Report #9, as shown in the data flow diagram of FIG. 3. HaBi is comprised of five phases:

(a) resolution of explicit directional controls (32 and 33);
(b) resolution of weak types (34);
(c) resolution of neutral types (35);
(d) resolution of implicit levels (36 and 37); and
(e) reordering of levels (38).

Currently, there is no direct support for Unicode in the 98 implementation of Haskell 98. As such, the method treats Unicode lists of 16- or 32-bit integers. The method is divided into two Haskell 98 modules for Unicode manipulation.

The first module is used to create Unicode (UCS4, UCS2, and UTF-8) strings. The second module determines character types. Additional utility functions convert Haskell strings with optional Unicode character escapes to 16- or 32-bit integer lists.

A Unicode escape takes the form \uhhhh, analogous to the Java reference implementation. This escape sequence is used for representing code points outside the range 0-00-0x7f. This format was chosen so as to permit easy comparison of results to other implementations.

Figure 2:
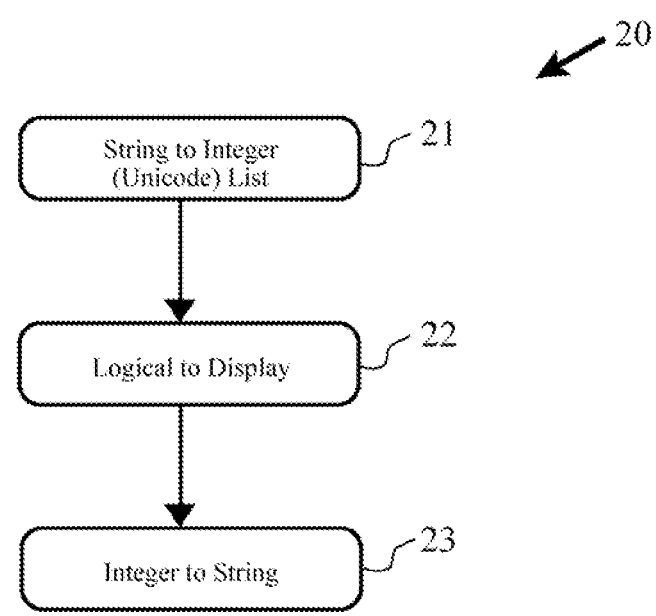
FIG. 2 illustrates the internal manipulation of Unicode as sequences of 32-bit integers.

Internally, HaBi manipulates Unicode as sequences of 32-bit integers, as shown in FIG. 2. HaBi is prepared to handle surrogates as soon as Unicode assigns them in the future; the only change HaBi would require is an updated character attribute table. It would be more elegant to use the polymorphism of Haskell since the algorithm does not really care about the type of a character only its attribute.

Each Unicode character has an associated Bidirectional attribute and level number. Again, FIG. 3 shows the general relationship of this information throughout the steps of the method.

The first step in our implementation is to lookup and assign bidirectional attributes to the logical character stream. The attributes are preferably obtained from the online character database as published in Unicode 3.0.

At this point, explicit processing assigns level numbers as well as honoring any directional overrides. Weak and neutral processing potentially causes attribute types to change based upon surrounding attribute types. Implicit processing assigns final level numbers to the stream which control reordering. Reordering then produces a sequence of Unicode characters in display order.

HaBi uses the following three internal types:
(a) type Attributed=(Ucs4, Bidi);
(b) type Level=(Int, Ucs4, Bidi); and
(c) data Run=LL[Level]|LR[Level]|RR[Level]|RL[Level]

Wherever possible, HaBi treats characters collectively as sequential runs rather than as individual characters. By using one of data type Run's four possible type constructors, characters can then be grouped by level. These four constructors signify the possible combinations of starting and ending run directions. For example, the LL constructor signifies that the start of a run and the end of a run are both left to right. Therefore, runs of LL followed by RL are not created.

Before the details of the disclosed source code are discussed, it is important to make note of the following concerning HaBi:

(a) the logical text stream is assumed to have already been separated into paragraphs and lines;
(b) directional control codes are removed once processed;
(c) no limit is imposed on the number of allowable embeddings; and
(d) mirroring is accomplished by performing character replacement.

By separating those facets of layout dealing with reordering from those that are concerned with rendering (line breaking, glyph selection, and shaping), comprehension of the Haskell implementation is more discernible.

In the Haskell source code provided in TABLE 11, functions are named in such a way so as to correspond to the appropriate section in the Unicode Bidirectional textual reference. For example, the function named "weak" refers to overall weak type resolution. While the function named "w1_7", lines 45-71 of TABLE 11, specifically refers to Unicode steps 1 through 7 in weak resolution.

The function "logicalToDisplay", lines 150-158 in TABLE 11, is used to convert a stream in logical order to one in display order. First, calls to the functions "explicit" (TABLE 11 lines 37-41), "weak" (lines 73-78), "neutral" (lines 94-99) and "implicit" (lines 114-119) form runs of fully resolved characters.

Calls to "reorder" (lines 134-140) and "mirror" (lines 142-148) are then applied to the fully resolved runs, which in turn yield a stream in display order. This is discussed in greater detail in the next few paragraphs.

The function "explicit" breaks the logical text stream into logical runs via calls to "p2_3" (lines 1-8), "x2_9" (lines 10-27), and "x10" (lines 29-35). The reference description suggests the use of stacks for keeping track of levels, overrides, and embeddings. In our implementation, stacks are used as well, but they are implicit rather than explicit (function "x2_9" arguments two, three, and four). The functions "weak", "neutral", and "implicit" are then mapped onto each individual run.

In "weak" steps 1 though 7 (lines 45-71), two pieces of information are carried forward (the second and third arguments of function "w1_7") the current directional state and the last character's type. There are cases in the method where a character's direction gets changed but the character's intrinsic type remains unchanged. For example, if a stream contained an AL followed by a EN, the AL would change to type R (step three in weak types resolution). However the last character would need to remain AL so as to cause the EN to change to AN (step two in resolution of weak types). The functions "n1_2" (lines 80-92) and "i1_2" (lines 102-112) resolve the neutral and implicit character types respectively.

Further details of these functions are fairly straight forward. At this point, runs are fully resolved and ready for reordering (function reorder). Reordering occurs in two stages. In the first stage, shown as function "reverse Run" (lines 121-126), a run is either completely reversed or left as is. This decision is based upon whether a run's level is even or odd. If it is odd (right to left), then it is reversed. In the second stage, shown as function "reverse Levels" (lines 128-132), the list of runs are reordered. At first it may not be obvious that the list being folded is not the list of runs, but is the list of levels, highest level to the lowest odd level in the stream. Once reordering is finished, the list of runs are collapsed into a single list of characters in display order.

All of the test cases discussed previously yield the expected results for the implementation given in TABLE 11, thereby avoiding the problems and inaccuracies of the other tested reference designs.

In summary, by using a functional language as the basis upon which we provide our bidirectional text display method, we are able to separate details that are not directly related to the algorithm. As such, reordering is completely independent from character encoding.

It does not matter what character encoding one uses (UCS4, UCS2, or UTF8). The Haskell type system and HaBi character attribute function allows the character encoding to change while not impacting the reordering algorithm, as opposed to other implementations which may find this level of separation difficult to achieve. HaBi presents the steps as simple, easy to understand, functions without side effects. This allows implementers to comprehend the true meaning of each step in the algorithm independently of the others while yet remaining free from language implementation details. Additionally, the creation of test cases is thus more systematic.

It will be recognized by those skilled in the art that many variations and substitutions may be made to the embodiment described herein without departing from the spirit and scope of the invention. For example, other functional programming methodologies may be adopted, such as use of a specific macro language, or use of alternate suitable operating systems and computer platforms. As such, the scope of this invention should be limited only by the language of the following claims.

TABLE 11

Haskell Source Code for HaBi

```
1  -- Rule P2, P3 determine base level of text from the first strong
2  -- directional character
3  p2_3 :: [Attributed] -> Int
4  p2_3 [ ] = 0
5  p2_3 ((_,L):xs) = 0
6  p2_3 ((_,AL):xs) = 1
7  p2_3 ((_,R):xs) = 1
8  p2_3 (_:xs) = p2_3(xs)
9
10 -- Rules X2 – X9
11 x2_9 :: [Int] -> [Bidi] -> [Bidi] -> [Attributed] -> [Level]
12 x2_9 _ [ ]=[ ]
13 x2_9 (l:ls) os es ((x,RLE):xs)
14 = x2_9 ((add l R):l:ls) (N:os) (RLE:es) xs
15 x2_9 (l:ls) os es ((x,LRE):xs)
16 = x2_9 ((add l L):l:ls) (N:os) (LRE:es) xs
17 x2_9 (l:ls) os es ((x,RLO):xs)
18 = x2_9 ((add l R):l:ls) (R:os) (RLO:es) xs
19 x2_9 (l:ls) os es ((x,LRO):xs)
20 = x2_9 ((add l L):l:ls) (L:os) (LRO:es) xs
21 x2_9 ls os (e:es) ((x,PDF):xs)
22 | elem e [RLE,LRE,RLO,LRO] = x2_9 (tail ls) (tail os) es xs
23 x2_9 ls os es ((x,PDF):xs)
24 = x2_9 ls os es xs
25 x2_9 ls os es ((x,y):xs)
26 | (head os) == N = ((head ls),x,y) : x2_9 ls os es xs
27 | otherwise = ((head ls),x,(head os)) : x2_9 ls os es xs
28
29 -- Rule X10 group characters by level
30 x10 :: (Int, Int) -> [Level] -> Run
31 x10 (sor,eor) xs
32 | even sor && even eor = LL xs
33 | even sor && odd eor = LR xs
34 | odd sor && even eor = RL xs
35 | otherwise = RR xs
36
37 -- Process explicit characters X1 – X10
38 explicit :: Int -> [Attributed] -> [Run]
39 explicit l xs = zipWith x10 (runList levels l l) groups
```

TABLE 11-continued

Haskell Source Code for HaBi

```
40 where levels = (map (\x -> level (head x)) groups)
41 groups = groupBy levelEql (x2__9 [l][N][ ] xs)
42
43
44
45 -- Rules W1 – W7
46 w1__7 :: [Level]->Bidi ->Bidi ->[Level]
47 w1__7 [ ] __ __ = [ ]
48 w1__7 ((x,y,L):xs) __ __ = (x,y,L):(w1__7 xs L L)
49 w1__7 ((x,y,R):xs) __ __ = (x,y,R):(w1__7 xs R R)
50 w1__7 ((x,y,AL):xs) __ __ = (x,y,R):(w1__7 xs AL R)
51 w1__7 ((x,y,AN):xs) dir __ = (x,y,AN):(w1__7 xs dir AN)
52 w1__7 ((x,y,EN):xs) AL __ = (x,y,AN):(w1__7 xs AL AN)
53 w1__7 ((x,y,EN):xs) L __ = (x,y,L):(w1__7 xs L EN)
54 w1__7 ((x,y,EN):xs) dir __ = (x,y,EN):(w1__7 xs dir EN)
55 w1__7 ((x,y,NSM):xs) L N = (x,y,L):(w1__7 xs L L)
56 w1__7 ((x,y,NSM):xs) R N = (x,y,R):(w1__7 xs R R)
57 w1__7 ((x,y,NSM):xs) dir last = (x,y,last):(w1__7 xs dir last)
58 w1__7 ((a,b,ES):(x,y,EN):xs) dir EN =
59 (a,b,EN):(x,y,EN):(w1__7 xs dir EN)
60 w1__7 ((a,b,CS):(x,y,EN):xs) dir EN =
61 (a,b,EN):(x,y,EN):(w1__7 xs dir EN)
62 w1__7 ((a,b,CS):(x,y,EN):xs) AL AN =
63 (a,b,AN):(x,y,AN):(w1__7 xs AL AN)
64 w1__7 ((a,b,CS):(x,y,AN):xs) dir AN =
65 (a,b,AN):(x,y,AN):(w1__7 xs dir AN)
66 w1__7 ((x,y,ET):xs) dir EN = (x,y,EN):(w1__7 xs dir EN)
67 w1__7 ((x,y,z):xs) dir last
68  | z==ET && findEnd xs ET == EN && dir /= AL
69 = (x,y,EN):(w1__7 xs dir EN)
70  | elem z [CS,ES,ET] = (x,y,ON):(w1__7 xs dir ON)
71  | otherwise = (x,y,z):(w1__7 xs dir z)
72
73 -- Process a run of weak characters W1 – W7
74 weak :: Run -> Run
75 weak (LL xs) = LL (w1__7 xs L N)
76 weak (LR xs) = LR (w1__7 xs L N)
77 weak (RL xs) = RL (w1__7 xs R N)
78 weak (RR xs) = RR (w1__7 xs R N)
79
80 -- Rules N1 – N2
81 n1__2 :: [[Level]] -> Bidi -> Bidi -> Bidi -> [Level]
82 n1__2 [ ] __ __ base = [ ]
83 n1__2 (x:xs) sor eor base
84  | isLeft x = x ++ (n1__2 xs L eor base)
85  | isRight x = x ++ (n1__2 xs R eor base)
86  | isNeutral x && sor == R && (dir xs eor) == R
87 = (map (newBidi R) x) ++ (n1__2 xs R eor base)
88  | isNeutral x && sor == L && (dir xs eor) == L
89 = (map (newBidi L) x) ++ (n1__2 xs L eor base)
90  | isNeutral x =
91 (map (newBidi base) x) ++ (n1__2 xs sor eor base)
92  | otherwise = x ++ (n1__2 xs sor eor base)
93
94 -- Process a run of neutral characters N1 – N2
95 neutral :: Run -> Run
96 neutral (LL xs) = LL (n1__2 (groupBy neutralEql xs) L L L)
97 neutral (LR xs) = LR (n1__2 (groupBy neutralEql xs) L R L)
98 neutral (RL xs) = RL (n1__2 (groupBy neutralEql xs) L R L)
99 neutral (RR xs) = RR (n1__2 (groupBy neutralEql xs) R R R)
100
101
102 -- Rule I1, I2
103 i1__2 :: [[Level]] -> Bidi -> [Level]
104 i1__2 [ ] __ = [ ]
105 i1__2 ((x:xs):ys) dir
106 |attrib x ==R && dir ==L
107 = (map (newLevel 1) (x:xs)) ++ (i1__2 ys L)
108  | elem (attrib x) [AN,EN] && dir == L
109 = (map (newLevel 2) (x:xs)) ++ (i1__2 ys L)
110  | elem (attrib x) [L,AN,EN] && dir == R
111 = (map (newLevel 1) (x:xs)) ++ (i1__2 ys R)
112 i1__2 (x:xs) dir = x ++ (i1__2 xs dir)
113
114 -- Process a run of implicit characters I1 – I2
115 implicit :: Run -> Run
116 implicit (LL xs) = LL (i1__2 (groupBy bidiEql xs) L)
117 implicit (LR xs) = LR (i1__2 (groupBy bidiEql xs) L)
118 implicit (RL xs) = RL (i1__2 (groupBy bidiEql xs) R)
119 implicit (RR xs) = RR (i1__2 (groupBy bidiEql xs) R)
120
121 -- If a run is odd (L) then reverse the characters
122 reverseRun :: [Level] -> [Level]
123 reverseRun [ ] = [ ]
124 reverseRun (x:xs)
125  | even (level x) = x:xs
126  | otherwise = reverse (x:xs)
127
128 reverseLevels :: [[Level]] -> [[Level]] -> Int -> [[Level]]
129 reverseLevels w [ ] __ = w
130 reverseLevels w (x:xs) a = if (level (head x)) >= a
131 then reverseLevels (x:w) xs a
132 else w ++ [x] ++ (reverseLevels [ ] xs a)
133
134 -- Rule L2 Reorder
135 reorder:: [Run] -> Bidi -> [[Level]]
136 reorder xs base = foldl (reverseLevels [ ]) runs levels
137 where
138 flat = concat (map toLevel xs)
139 runs = map reverseRun (groupBy levelEql flat)
140 levels = getLevels runs
141
142 -- Rule L4 Mirrors
143 mirror:: [Level] -> [Level]
144 mirror [ ] = [ ]
145 mirror ((x,y,R):xs) = case getMirror y of
146 Nothing -> (x,y,R):(mirror xs)
147 Just a -> (x,a,R):(mirror xs)
148 mirror (x:xs) = x:(mirror xs)
149
150 logicalToDisplay :: [Attributed] -> [Ucs4]
151 logicalToDisplay attribs
152 =let baseLevel = p2__3 attribs in
153 let baseDir = (if odd baseLevel then R else L) in
154 let x = explicit baseLevel attribs in
155 let w = map weak x in
156 let n = map neutral w in
157 let i = map implicit n in
158 map character (mirror (concat (reorder i baseDir)))
```

What is claimed is:

1. A computer-implemented method for displaying bi-directional text on a computer display comprising:

detecting by a computer that a string of characters for display to a human interface device contains one or more Arabic Letters followed by one or more European Numbers;

responsive to the detecting, treating by the computer the one or more European Numbers as one or more Arabic Numbers by:

assigning bidirectional attributes to a logical character stream;

assigning initial level numbers while honoring any directional overrides by explicit processing, wherein the directional overrides include Left-to-right display order and Right-to-left display order;

changing attribute types based upon surrounding attribute types through weak processing and neutral processing, wherein, during the weak processing, a directional override is changed to Right-to-left display order for a last Arabic Letter of the one or more Arabic Letters which immediate precedes a first character of the one or more European Numbers while retaining an attribute type of Arabic Letter for the last Arabic Letter, thereby causing the first European Number to change to an attribute type of Arabic Number;

associating final level numbers to the logical character stream through implicit processing; and reordering the string of characters within the logical character stream into display order according to the final level numbers by separately handling facets of layout relating to character reordering and facets related to character stream rendering; and displaying by a computer the reordered string of characters to a human interface device.

2. The computer-implemented method as set forth in claim 1 wherein the reordering is performed in at least in part in a functional programming language.

3. The computer-implemented method as set forth in claim 1 further comprising handling the character stream as sequential runs of integers during the steps of assigning attributes, level numbers, changing attribute types, associating final level numbers, and reordering characters.

4. The computer-implemented method as set forth in claim 1 wherein the step of changing attribute types based upon surrounding attribute types through weak and neutral processing in a functional programming language comprises providing blocks of functional programming language indexed by name weak type processing, neutral type processing, and implicit level processing such that the method may be readily used as a reference.

5. The computer-implemented method as set forth in claim 1 wherein one or more steps are provided at least in part in Haskell functional language.

6. The computer-implemented as set forth in claim 1 wherein one or more steps are provided at least in part in Erlang functional language.

7. The computer-implemented method as set forth in claim 1 wherein one or more steps are provided at least in part in Standard Machine Language ("SML") functional language.

8. The computer-implemented method as set forth in claim 1 wherein one or more steps are provided in Miranda functional language.

9. The computer-implemented method as set forth in claim 1 wherein one or more steps are provided at least in part in Lisp functional language.

10. The computer-implemented method as set forth in claim 1 wherein one or more steps are provided at least in part in Scheme functional language.

11. A computer program product for displaying bi-directional text on a computer display comprising:

a computer-readable storage memory device suitable for storage of program instructions;

program instruction embodied by the computer-readable storage memory device which cause a computer processor, when executed, to:

detect a string of characters for display to a human interface device contains one or more Arabic Letters followed by one or more European Numbers;

assign bidirectional attributes to a logical character stream;

assign initial level numbers while honoring any directional overrides by explicit processing, wherein the directional overrides include Left-to-right display order and Right-to-left display order;

change attribute types based upon surrounding attribute types through weak processing and neutral processing, wherein, during the weak processing, a directional override is changed to Right-to-left display order for a last Arabic Letter of the one or more Arabic Letters which immediate precedes a first character of the one or more European Numbers while retaining an attribute type of Arabic Letter for the last Arabic Letter, thereby causing the first European Number to change to an attribute type of Arabic Number;

associate final level numbers to the logical character stream through implicit processing; and reorder the string of characters within the logical character stream into display order according to the final level numbers by separately handling facets of layout relating to character reordering and facets related to character stream rendering; and display the reordered string of characters to a human interface device.

12. The computer program product as set forth in claim 11 wherein the program instruction for reordering comprises functional programming language.

13. The computer program product as set forth in claim 11 further comprising program instruction to handle the character stream as sequential runs of integers during the steps of assigning attributes, level numbers, changing attribute types, associating final level numbers, and reordering characters.

14. The computer program product as set forth in claim 11 wherein the program instruction for changing attribute types based upon surrounding attribute types through weak and neutral processing comprises blocks of functional programming language indexed by name weak type processing, neutral type processing, and implicit level processing such that the method may be readily used as a reference.

15. The computer program product as set forth in claim 11 wherein the program instruction comprises Haskell functional language.

16. The computer program product as set forth in claim 11 wherein the program instruction comprises Erlang functional language.

17. The computer program product as set forth in claim 11 wherein the program instruction comprises Standard Machine Language ("SML") functional language.

18. The computer program product as set forth in claim 11 wherein the program instruction comprises Miranda functional language.

19. The computer program product as set forth in claim 11 wherein the program instruction comprises Lisp functional language.

20. The computer program product as set forth in claim 11 wherein the program instruction comprises Scheme functional language.

21. A text code conversion system for displaying bi-directional text on a computer display comprising:

a computer processor for performing a logical process;

a computer-readable storage memory device suitable for storage of program instructions;

program instruction embodied by the computer-readable storage memory device which cause a computer processor, when executed, to:

detect a string of characters for display to a human interface device contains one or more Arabic Letters followed by one or more European Numbers;

assign bidirectional attributes to a logical character stream;

assign initial level numbers while honoring any directional overrides by explicit processing, wherein the directional overrides include Left-to-right display order and Right-to-left display order;

change attribute types based upon surrounding attribute types through weak processing and neutral processing, wherein, during the weak processing, a directional override is changed to Right-to-left display order for a last Arabic Letter of the one or more Arabic Letters which immediate precedes a first character of the one or more European Numbers while retaining an attribute type of Arabic Letter for the last Arabic Letter, thereby causing the first European Number to change to an attribute type of Arabic Number;

associate final level numbers to the logical character stream through implicit processing; and reorder the string of characters within the logical character stream into display order according to the final level numbers by separately handling facets of layout relating to character reordering and facets related to character stream rendering; and display the reordered string of characters to a human interface device.

22. The text code conversion system as set forth in claim 21 wherein the assigning of bidirectional attributes comprises obtaining bidirectional attributes from a character database.

23. The text code conversion system as set forth in claim 21 wherein the program instruction further comprises program instructions for grouping characters into sequential runs using type constructors and level such that characters are processed collectively rather than individually.

24. The text code conversion system as set forth in claim 21 wherein the program instructions for changing attribute types comprises blocks of functional programming language indexed by name weak type processing, neutral type processing, and implicit level processing such that the method may be readily used as a reference.

25. The text code conversion system as set forth in claim 21 wherein the program instruction comprise Haskell functional language.

26. The text code conversion system as set forth in claim 21 wherein the program instruction comprise Erlang functional language.

27. The text code conversion system as set forth in claim 21 wherein the program instruction comprise Standard Machine Language ("SML") functional language.

28. The text code conversion system as set forth in claim 21 wherein the program instruction comprise Miranda functional language.

29. The text code conversion system as set forth in claim 21 wherein the program instruction comprise Lisp functional language.

30. The text code conversion system as set forth in claim 21 wherein the program instruction comprise Scheme functional language.

* * * * *